Dec. 10, 1940.      J. F. ROUGVIE      2,224,275
APPARATUS FOR PRODUCING A CURRENT
Filed May 3, 1939
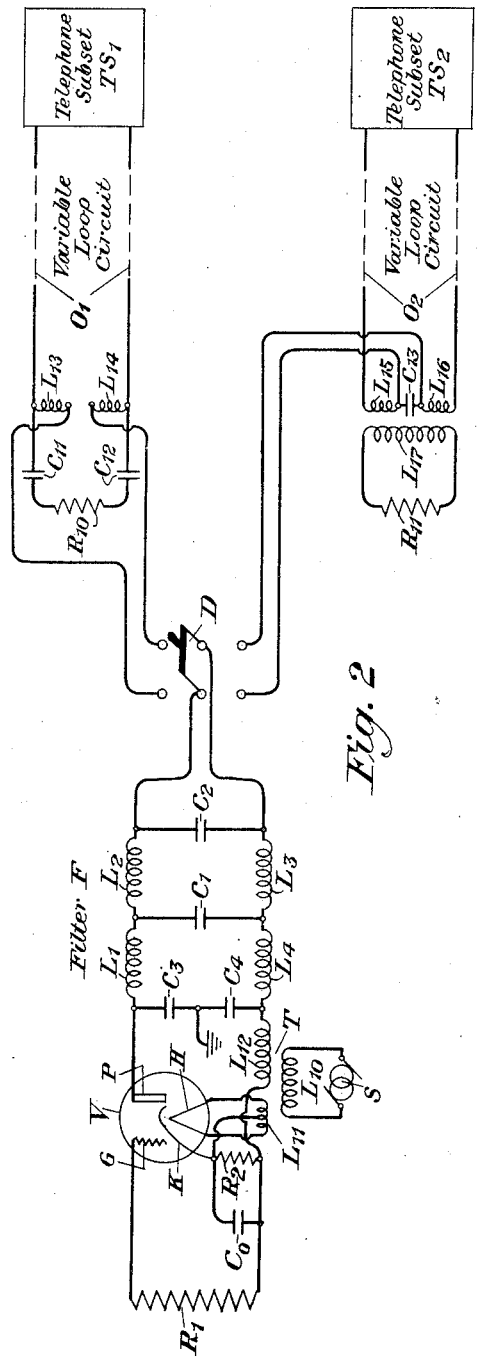
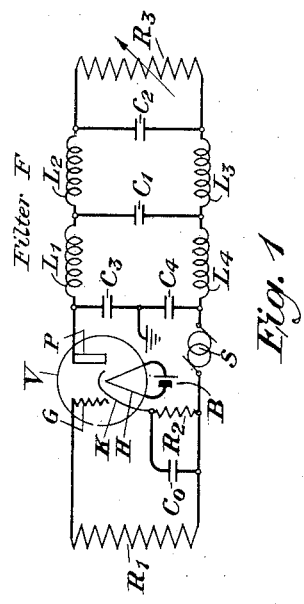
INVENTOR
J. F. Rougvie
BY William R. Ballard
ATTORNEY Patented Dec. 10, 1940

2,224,275

UNITED STATES PATENT OFFICE 2,224,275

APPARATUS FOR PRODUCING A CURRENT

James Ferguson Rougvie, Belmont, Mass., assignor to American Telephone and Telegraph Company, a corporation of New York Application May 3, 1939, Serial No. 271,579

7 Claims. (Cl. 179—77)

This invention relates to electrical transmission systems. More particularly this invention relates to electrical systems used for the production of currents which are substantially constant in amplitude, or having an amplitude which is kept at a substantially optimum value with respect to the load resistance. Still more particularly this invention relates to electrical systems and apparatus used for converting alternating current into direct current and for maintaining the direct current substantially constant while the load resistance varies over a considerable range.

In accordance with this invention current supplied by an alternating current generator is rectified, and the rectified current is transmitted through a load circuit in such a way that the current through the load circuit will remain substantially constant or substantially at an optimum value over wide variations in the magnitude of the load circuit. The generated alternating current is transmitted through a multielectrode tube including grid, cathode and anode electrodes, with a resistor in common with the grid and anode circuits as well as with the load circuit. As the resistance of the load circuit is varied over a wide range the current supplied to the load circuit will be substantially constant or optimum in magnitude. The constancy of the current will be brought about by applying to the grid electrode of the tube the varying voltage produced across the terminals of the resistor common to the grid and cathode circuits, this grid voltage varying in accordance with the resistance of the load circuit.

This invention will be better understood from the detailed description hereinafter following and read in connection with the accompanying drawing in which Figure 1 shows a form of circuit broadly illustrating the principles involved in this invention, and Fig. 2 shows the invention employed in telephone systems having loop circuits of different lengths and resistances.

Referring to Fig. 1 of the drawing, the reference character V designates a gas-filled tube including a grid G, an anode P, a cathode K and a heater H of well-known construction. The heater H is supplied continuously with current obtained from a battery B. The grid G is connected to the cathode K by two resistors $R_1$ and $R_2$ which are in series relationship. The resistor $R_2$ is connected in parallel with a condenser $C_0$. The anode P and cathode K of the tube V are connected in a circuit which includes coils $L_1$ and $L_2$, the load circuit $R_3$, the coils $L_3$ and $L_4$, the generator S and the resistor $R_2$. The coils $L_1$, $L_2$, $L_3$ and $L_4$ may be equal inductances which form part of an electrical wave filter F of the low pass type, this filter including the condenser $C_1$ connecting the terminal common to coils $L_1$ and $L_2$ with the terminal common to the coils $L_3$ and $L_4$. The other terminals of coils $L_2$ and $L_3$ are interconnected by a condenser $C_2$ which may, for example, have half the capacity of the condenser $C_1$. The remaining terminals of the coils $L_1$ and $L_4$ may be connected by the series condensers $C_3$ and $C_4$, each of which may have approximately one-fourth of the capacity of the condenser $C_1$. The terminals common to the condenser $C_3$ and $C_4$ may be grounded as shown.

The gas tube V is employed to act as a rectifier. The alternating current supplied by the source S is rectified in the circuit interconnecting the anode P and cathode K above described, and the rectified current may be utilized at the load resistor $R_3$ for any purposes whatsoever. The flow of the rectified current through the resistor $R_2$ causes a voltage to be produced thereacross, which renders the grid electrode of the tube V negative with respect to the cathode K. This negative voltage will vary in accordance with the amount of current flowing through the load resistor $R_3$.

As the resistance of the load resistor $R_3$ is cut down to lower and lower values there will be a tendency for a larger current to flow therethrough. This larger than desired current will increase the drop in potential across the resistor $R_2$, and this in turn will increase the biasing voltage applied to the grid electrode G of the tube. Hence the current flowing between the anode P and cathode K will be reduced by a corresponding amount. In actual practice it has been determined that the direct current flowing through the load resistor $R_3$ will remain substantially constant even over large variations in the magnitude of the load resistance $R_3$. Thus, the load resistor $R_3$ may be cut out entirely or, if desired, increased to two or three thousand ohms or to any reasonable magnitude without substantially varying the direct current supplied by the system.

The resistor $R_1$ is of large magnitude and is employed to prevent the flow of current between the grid and cathode electrodes G and K, respectively. The condenser $C_0$ acts to smooth out the voltage produced across the resistor $R_2$. The filter F acts not only to smooth out the direct current supplied to the load resistor $R_3$, but also to suppress any noise or hum that may tend to be transmitted from the generator S to the load resistor $R_3$, or to any apparatus or circuits (not shown in Fig. 1) connected thereto.

One form of tube that may be used in the circuit just described is of the Western Electric 277–A type. It will be understood, of course, that other types of gas-filled tubes may be substituted therefor. In certain special situations a vacuum tube may replace the tube V. The bias for the grid electrode G may be obtained from resistors or from batteries, or from combinations of both resistors and batteries, as will be understood by those skilled in the art. The circuit illustrated in Fig. 1 may be used in any place where it is desired to convert alternating current into direct current, and to maintain the flow of direct current substantially constant under load conditions which vary over a considerable range.

It will be understood that by adjustment of the resistors shown in Fig. 1 and by adding a source of voltage to the circuit of the grid G, a bias may be obtained for the grid electrode of the tube V which will provide a larger flow of direct current when the load resistor is of a higher value and a smaller flow of direct current when the load resistor is of a lower value. Such a modification of the circuit is of course optional and will be understood by those skilled in the art.

Fig. 2 shows a modification of the circuit of Fig. 1 connected to two telephone substation circuits over loop circuits of different length or resistance. The source of alternating current S is connected to the primary winding $L_{10}$ of the transformer T, one of the secondary windings $L_{11}$ of which supplies the necessary heating current for the heater H of the tube V, while the secondary winding $L_{12}$ is connected in series with the resistor $R_2$ and the coils $L_4$ and $L_3$ of the filter F. The rectified current of a substantially constant amplitude appearing at the terminals of the condenser $C_2$ of the filter F may be supplied through a double-pole double-throw switch D to either of two telephone substation sets $TS_1$ or $TS_2$ over loop circuits $O_1$ and $O_2$, respectively. The upper terminals of the switch D are connected through the coils $L_{13}$ and $L_{14}$ and over the loop $O_1$ to the telephone substation sets $TS_1$. The coils $L_{13}$ and $L_{14}$ and the condensers $C_{11}$ and $C_{12}$ may be part of a step-by-step cord circuit of well-known type, and this cord circuit may be terminated and a resistor $R_{10}$ as shown, simulating a trunk circuit over which telephone currents may be transmitted from the substation set $TS_1$.

The lower terminals of the switch D are connected through coils $L_{15}$ and $L_{16}$ through a loop circuit $O_2$ to another telephone substation set $TS_2$. The condenser $C_{13}$ prevents the passage of direct current between the lower terminal of coil $L_{15}$ and the upper terminal of coil $L_{16}$ while permitting the flow of voice or other telephone or alternating currents in general therethrough. The coils $L_{15}$ and $L_{16}$ are coupled to the coil $L_{17}$, which together with coils $L_{15}$ and $L_{16}$ and condenser $C_{13}$ may form a repeating coil cord circuit of well-known type. The resistor $R_{11}$ simulates the trunk circuit to which the cord circuit is usually connected.

When the switch D is manipulated to close its upper two contacts, the direct current fed through the filter F will be transmitted over coils $L_{13}$ and $L_{14}$ and over the loop circuit $O_1$ to the telephone substation set $TS_1$. The loop circuit $O_1$ will be used for the purpose of conveying speech and signaling currents to and from the telephone substation circuit $TS_1$. This direct current will be used for the purpose of providing battery supply over the loop circuit $O_1$ to actuate the transmitter in the telephone substation circuit $TS_1$. This direct current will be maintained substantially constant in magnitude even if the current rectifying system is connected to any one of a plurality of other telephone substation circuits similar to the one designated $TS_1$ over different loop circuits which vary widely in resistance. If desired, a suitable bias and resistor combination may be provided for the grid electrode G of tube V so that the direct current will be increased in magnitude when the current rectifying system is connected to a loop circuit of higher resistance and decreased in magnitude when the current rectifying system is connected to a loop circuit of lower resistance.

Similarly, as the switch D is manipulated to close its lower contacts, rectified current will be supplied over coils $L_{15}$ and $L_{16}$ over the loop circuit $O_2$ to the telephone substation circuit $TS_2$. The magnitude of the current supplied to the substation circuit $TS_2$ will be maintained substantially constant even if loops of widely differing resistances were substituted therefor. And as already pointed out hereinabove, by a suitable arrangement of resistors and a bias battery connected to the grid G, the direct current may be increased in magnitude when the current rectifying system is connected to a loop circuit of higher resistance and decreased in magnitude when the current rectifying system is connected to a loop circuit of lower resistance. This latter arrangement is of course optional.

The speech currents flowing to or from the telephone substation circuit $TS_1$, for example, are transmitted over the circuit including the upper conductor of the loop $O_1$ and condenser $C_{11}$ into the resistor $R_{10}$ which simulates the trunk and the other substation circuit (not shown) to which the substation circuit $TS_1$ may be connected, thence through condenser $C_{12}$, back over the lower conductor of the loop $O_1$ to the substation $TS_1$. Coils $L_{13}$ and $L_{14}$ have sufficiently large values of inductance to prevent speech currents from passing from the upper conductor of loop $O_1$ to its lower conductor, but they have sufficiently low values of resistance so that little resistance will be offered to the flow of direct current from the current rectifying system to the loop circuit $O_1$. The filter F will act to prevent any noise in the circuit of the generator S from being transmitted to the telephone substation circuit $TS_1$, or to the telephone circuits (not shown) connected to resistor $R_{10}$. Similarly, any speech currents flowing through the telephone substation set $TS_2$ will flow over the loop circuit $O_2$ and over the coils $L_{15}$ and $L_{16}$ and condenser $C_{13}$. These telephone currents will be substantially free from noise which may be present in the apparatus connected to the gas tube V.

The use of the rectified constant current apparatus in connection with telephone substation circuits, for example, of the type shown in Fig. 2, permits the employment of loop circuits of considerably reduced diameter or increased resistance per unit of length. The constant current apparatus permits substituting a loop conductor of finer gauge or of higher resistance between the telephone exchange and the telephone subset without decreasing the transmitting efficiency of the subset. Where an arrangement of batteries and resistor provides the required biasing arrangement for the grid electrode G as already noted, and a greater amount of direct current is furnished when the current rectifying system is connected to a loop circuit of higher resistance, the transmitting efficiency of the subset will be increased, and the increased output of the subset will tend to overcome the increased attenuation of these higher resistance circuits to speech currents. These features are important because they reduce the cost of the copper required for the telephone plant to provide a given transmission performance.

While this invention has been shown and described in certain arrangements merely for the purpose of illustration, it will be understood that this invention may be applied to other and widely varied organizations without departing from the spirit of the invention and the scope of the appended claims.

What is claimed is:

1. Apparatus for producing rectified current of substantially constant amplitude comprising a source of alternating current, a single gas tube having grid, plate and cathode electrodes, a resistor, a low-pass filter, a load circuit connected in series with said source and the anode and cathode electrodes and said resistor through said filter, and means for applying the voltage across said resistor between the grid and cathode electrodes of the tube.

2. Rectifying apparatus comprising the combination of a single gas-filled tube having grid, plate and cathode electrodes, a resistor, a low-pass filter, a source of alternating current connected in series with said resistor and with the plate and cathode electrodes of said tube through said filter, said series circuit rectifying the current of said source, means for applying the voltage across said resistor between grid and cathode electrodes of said tube, the potential across said resistor varying in accordance with the magnitude of the current flowing between the plate and cathode electrodes.

3. Apparatus for converting the current of an alternating current generator into direct current and for maintaining said direct current substantially constant over large variations in the magnitude of the load circuit supplied with said direct current, comprising a single gas-filled tube having grid, plate and cathode electrodes, a low-pass filter, a resistor connected in circuit with said plate and cathode electrodes and said load circuit and said generator through said filter, and a circuit connecting said resistor between the grid and cathode electrodes of said tube.

4. Apparatus for supplying substantially constant direct current to a load circuit comprising a gas tube having at least three electrodes, a resistor, a source of alternating current connected in series with said resistor and two of the electrodes of the gas tube, a filter interconnecting the circuit of said source with said load circuit, and means for connecting said resistor between the third electrode of said tube and one of the other electrodes.

5. Apparatus for supplying a substantially constant current to a telephone loop circuit comprising a source of alternating current, a gas tube having three electrodes, an impedance interconnecting said source and two of the electrodes of said tube, means for applying the potential across said impedance between the third electrode and one of the other electrodes of said tube, and a low pass filter interconnecting the circuit of the source of alternating current with said loop circuit.

6. Apparatus for supplying substantially constant direct current to any one of a plurality of loop circuits having widely different impedances, comprising a source of alternating current, a resistor, a low-pass filter, a gas tube having at least three electrodes two of which are connected in series with said resistor and said source of alternating current through said filter, said latter circuit supplying rectified current to any one of said loop circuits, and means for applying the potential across said resistor between the third electrode and one of the other electrodes of said tube.

7. Apparatus for producing rectified current of substantially constant amplitude comprising a source of alternating current, a gas tube having grid, plate and cathode electrodes, biasing means for the grid electrode of said tube, said biasing means including a resistor network, a low-pass filter, a load circuit connected in series with said source and the anode and cathode electrodes and said resistor network through said filter, and means for applying the voltage across said resistor network between the grid and cathode electrodes of said tube.

JAMES FERGUSON ROUGVIE.